3,311,606
MONOAZO DYES

Robert W. Eltonhead, Reading, Pa., assignor to Crompton & Knowles Corporation, Worcester, Mass., a corporation of Massachusetts
No Drawing. Filed Oct. 14, 1963, Ser. No. 316,112
7 Claims. (Cl. 260—204)

This invention relates to a new group of monoazo compounds which are useful as dyes. The new compounds have the following structure:

(Structure I)

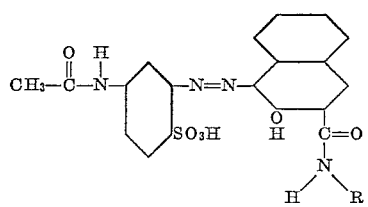

wherein R represents an aryl group having a total molecular weight of not more than about 175. As used herein, the term aryl group contemplates both unsubstituted aryl radicals and aryl radicals that include simpler substituents such as halogen, alkyl, alkoxy groups and the like.

The new compounds are obtained by diazotizing 2 amino-4-acetylamino benzene sulfonic acid and coupling the diazo to arylamides of 3 hydroxy 2 naphthoic acid under alkaline conditions and thereafter recovering the dyestuff either in the form of the free acid or its salts.

The compounds prepared in accordance with the invention have unique and highly valuable properties when used as dyes. They dye polyurethane fibers and natural and synthetic polyamide fibers such as nylons, silk and wool in bright scarlet shades of good lightfastness. The fabric so dyed shows excellent stability of color to acids and also when aftertreated with acid catalyzed thermosetting or fiber reactive resins or with other aldehydic finishes. The dyeing can be effected from neutral solution and with a high degree of dye exhaustion.

The intermediate 2 amino-4-acetylamino benzene sulfonic acid can be prepared as follows:

5640 grams of 1,3 diamino benzene-4-sulfonic acid in the form of 54% paste was added to 30 liters of water at 40° C. While stirring, soda ash was added to adjust the pH to 8.0. Decolorizing carbon 270 grams was added and the solution clarified by filtering through Filter-Cel. The filtrate was iced to 13° C. and agitated vigorously while 2150 grams of acetic anhydride was added over 20 minutes. The resulting 68 liters volume at pH 3.8 and 24° C. was stirred overnight. 9 liters of 31.5% hydrochloric acid were added to precipitate the product which was filtered off and washed with 30 liters of 5% hydrochloric acid. The resulting paste contained 6250 grams of 2 amino-4-acetylamino benzene sulfonic acid as determined by a nitrite titer on a sample of the paste.

The base prepared as described above can be diazotized and thereafter coupled under alkaline conditions with coupling components which are arylamides of 3 hydroxy 2 naphthoic acid. Suitable coupling components for purposes of this invention include those substituted and unsubstituted arylamides of 3 hydroxy 2 naphthoic acid which will, when coupled with the diazo base, have sufficient water solubility to meet the requirements of commercial dyeing operations. Because of the water solubility characteristics of the end product and brightness of shade, it is preferred to employ the unsubstituted and mono substituted arylamides such as:

Naphthol AS-D (3-hyroxy-2-naphth-o-toluidide)
Naphthol AS-OL (3-hydroxy-2-naphth-o-anisidide)
Naphthol AS-RL (3-hydroxy-2-naphth-p-anisidide)
Naphthol AS-PH (3-hydroxy-2-naphth-o-phenetidide)
Naphthol AS-E (4'-chloro-3-hydroxy-2-naphthanilide)
Naphthol AS (3-hydroxy-2-naphthanilide)

In general, the commercially available coupling components of this type are known as the naphthol AS series that are useful for the production of azoic dyes (see The Chemistry of Synthetic Dyes and Pigments—Lubs—ACS Monograph No. 127 commencing at page 181).

However, unlike the azoic dyes, the use of naphthol AS coupling components according to this invention result in the production of water soluble dyestuffs. The dyes of this invention have excellent affinity for polyurethane and natural and synthetic polyamide fibers and little affinity for cotton and viscose. The invention, however, is not to be construed as being limited to the arylamides of the naphthol AS series. Any arylamide of 3 hydroxy 2 naphthoic acid which, when coupled with a diazotized base of 2 amino-4-acetylamino benzene sulfonic acid will form a compound of Structure I wherein R is an aryl group having a total molecular weight of not more than about 175 can be employed. Where the R of the Structure I compounds is greater than about 175 the resulting dye will be insufficiently soluble for use as a neutral dyeing dye for polyamide fibers.

The following examples will serve to illustrate how the compounds of this invention can be prepared. In these examples, unless otherwise indicated, parts are by weight, temperatures are given by degree centigrade and percentages are percentages by weight.

Example 1

An amount of paste equal to 23 grams (.1 mole) of 2 amino-4-acetylamino benzene sulfonic acid was slurried with 100 cc. of water and 40 cc. of 31.5% hydrochloric acid. After icing to 12° C., 25 cc. of solution containing 7.0 grams of sodium nitrite was added. After stirring three hours to complete the diazotization the solid diazo was filtered off and washed with 25 cc. of 5% hydrochloric acid. Naphthol AS 13.1 grams was dissolved in 160 cc. of hot water containing 3.0 grams of sodium hydroxide. Decolorizing carbon was added and the hot solution was clarified by filtering through Filter-Cel. 10 grams of sodium chloride were added and the filtrate was cooled to 30° C. A slurry of one-half of the above obtained diazo was then slowly added. The resulting pH was 9.7 at 30° C. After stirring overnight, the pH was adjusted to 8.5 with hydrochloric acid, and 40 grams of sodium chloride was added. The 500 cc. volume coupling was then heated to 100° C. and filtered hot. The dyestuff filter cake was washed with 1000 cc. of 5% sodium chloride solution and dried. The dye obtained was the sodium salt of—

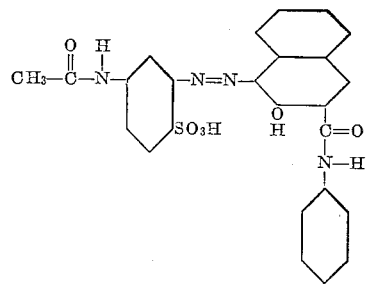

Example 2

14.6 grams of naphthol AS-RL was dissolved in 160 cc. of hot water containing 3.0 grams of sodium hydroxide. Decolorizing carbon was added and the hot solution was clarified by filtering through Filter-Cel. 10 grams of sodium chloride were added and the filtrate cooled to 30° C. The remaining one-half of diazo from Example 1 was slurried in water and slowly added. The resulting pH was 10.5 at 30° C. After stirring overnight, the pH of the coupling was adjusted to 8.5 with hydrochloric acid and 40 grams of sodium chloride were added. It was then heated to 100° C., filtered hot and the dyestuff filter cake washed with 1000 cc. of 5% sodium chloride solution. The filter cake was dried. The dye obtained was the sodium salt of—

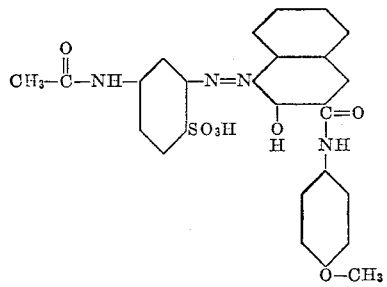

Example 3

27.7 grams of naphthol AS–D was dissolved in 335 cc. of hot water containing 5.0 grams of sodium hydroxide. Decolorizing carbon was added and the hot solution was clarified by filtering through Filter-Cel. The filtrate was cooled to 35° C. and a slurry of the solid diazo of 2-amino-4-acetylamino benzene sulfonic acid (prepared as in Example 1) was added, followed by the addition of 15 grams of sodium chloride. After stirring overnight, hydrochloric acid was added to adjust the pH to 8.5. 55 grams of sodium chloride was added to the 700 cc. volume. After heating to a boil and filtering hot the filter cake was washed with 5% sodium chloride. The filter cake contained the sodium salt of—

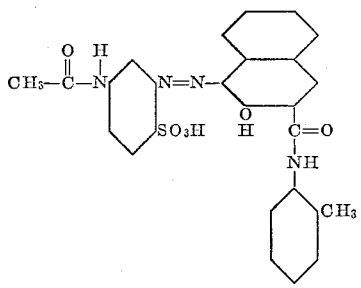

Example 4

15 grams of naphthol AS–OL was dissolved in 305 cc. of hot water containing 2.5 grams of sodium hydroxide and 13 grams of sodium acetate. Decolorizing carbon was then added and the hot solution was clarified by filtering through Filter-Cel. The cooled 30° C. filtrate was then added to a slurry of diazo prepared in the manner of Example 1 from 12.5 grams (.05 mole) of 2 amino-4-acetylamino benzene sulfonic acid. 25 grams of sodium chloride were then added. The 22° C. coupling was stirred overnight following which hydrochloric acid was added to adjust the pH to 9.5. The coupling was filtered and dried. The dye obtained was the sodium salt of—

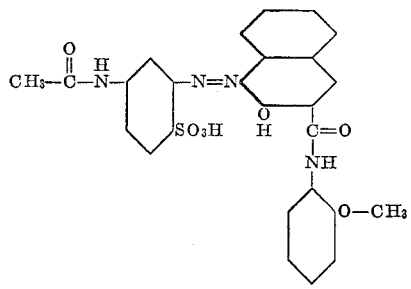

Example 5

18 grams of naphthol AS–ITR (5′-chloro-3-hydoxy-2′4′-dimethoxy-2-naphthanilide) were used instead of 15 grams of naphthol AS–OL in Example 4. The dye obtained was the sodium salt of—

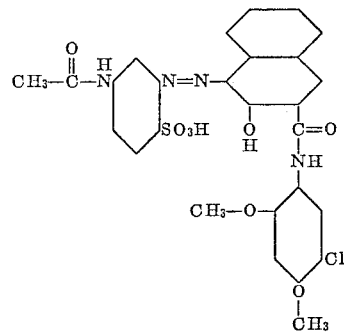

Example 6

A slurry of filtered solid diazo obtained by diazotizing .1 mole of 2 amino-4-acetylamino benzene sulfonic acid according to Example 1 was added to a filtered solution of 30.7 grams of naphthol AS–PH which had been dissolved in 355 cc. of hot water containing 5 grams of sodium hydroxide. After stirring overnight, the dyestuff was filtered off and dried. The dye obtained was the sodium salt of—

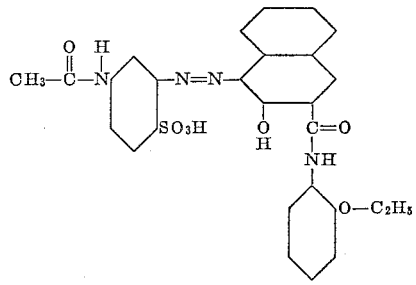

Example 7

A slurry of filtered solid diazo obtained by diazotizing .05 mole of 2 amino-4-acetylamino benzene sulfonic acid in the manner of Example 1 was added to a clarified filtered solution of 12.8 grams naphthol AS–E which had been dissolved in 430 cc. of water containing 5.4 grams of sodium hydroxide and 50 grams of sodium chloride. After stirring overnight, the dyestuff was isolated using the Example 1 procedure. The dye obtained was the sodium salt of—

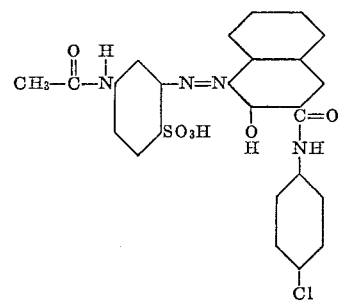

Example 8

Using the methods disclosed in the previous examples, the diazo of 2 amino-4-acetylamino benzene sulfonic acid was coupled to the following naphthols. The dyestuffs obtained were reddish shades and had the following general structure:

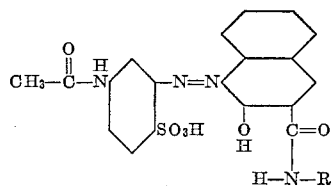

| Naphthol Coupling Component | Name | R will be— |
|---|---|---|
| AS-TR | 4'-chloro-3-hydroxy-2-naphth-o-toluidide. | (phenyl with CH₃ and Cl) |
| AS-CL | 5'-chloro-3-hydroxy-2-naphth-o-anisidide. | (phenyl with Cl and O—CH₃) |
| AS-BG | 3-hydroxy-2'-5'-dimethoxy-2-naphthanilide. | (phenyl with O—CH₃ and CH₃O) |
| AS-BO | 3-hydroxy-N-1-naphthyl-2-naphthamide. | (naphthyl) |
| AS-BS | 3-hydroxy-3'-nitro-2-naphtnahilide. | (phenyl with NO₂) |
| AS-LC | 4'-chloro-3-hydroxy-2',5'-dimethoxy-2-naphthanilide. | (phenyl with O—CH₃, Cl, CH₃—O) |
| AS-SW | 3-hydroxy-N-2-naphthyl-2-naphthamide. | (naphthyl) |

The dyes obtained in all of the foregoing examples dyed nylon tricot in reddish shades from a neutral bath with good exhaustion of color.

I claim:
1. A compound having the following structure:

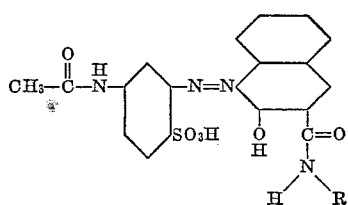

wherein R is an aryl radical having a total molecular weight of not more than 175 and represents phenyl, naphthyl and phenyl or naphthyl containing nitro, chloro, alkyl or alkoxy groups as substituents thereof.

2. The sodium salts of compounds according to claim 1.
3. The compound—

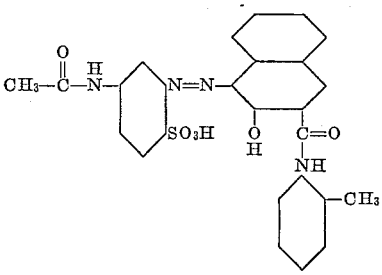

4. The compound—

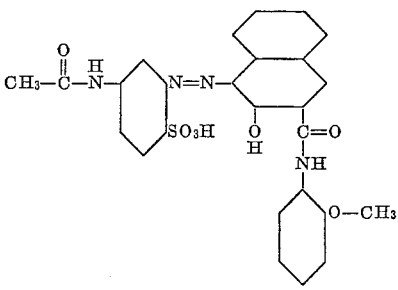

5. The compound—

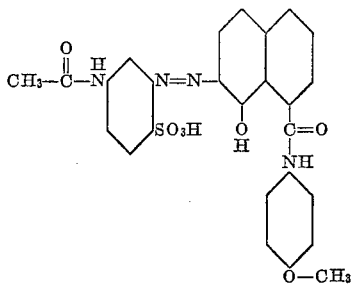

6. The compound—

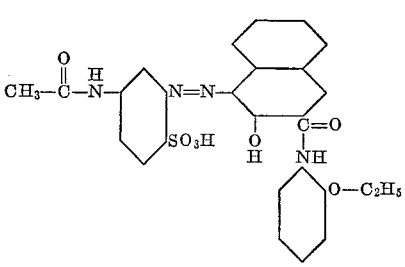

7. The compound—

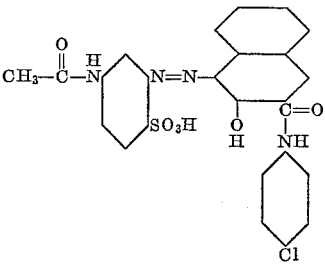

No references cited.

CHARLES B. PARKER, Primary Examiner.
DONALD M. PAPUGA, Assistant Examiner.